United States Patent
Kiwaki

(10) Patent No.: US 9,010,392 B2
(45) Date of Patent: Apr. 21, 2015

(54) PNEUMATIC RADIAL TIRE WITH TREAD HAVING THIN CIRCUMFERENTIAL GROOVE AND LUG GROOVE

(75) Inventor: Yukihiro Kiwaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 957 days.

(21) Appl. No.: 12/531,034

(22) PCT Filed: Mar. 11, 2008

(86) PCT No.: PCT/JP2008/054357
§ 371 (c)(1),
(2), (4) Date: Sep. 11, 2009

(87) PCT Pub. No.: WO2008/111577
PCT Pub. Date: Sep. 18, 2008

(65) Prior Publication Data
US 2010/0084061 A1   Apr. 8, 2010

(30) Foreign Application Priority Data

Mar. 13, 2007 (JP) ................................. 2007-063561

(51) Int. Cl.
*B60C 11/13* (2006.01)
*B60C 11/01* (2006.01)
*B60C 11/03* (2006.01)

(52) U.S. Cl.
CPC ................. *B60C 11/13* (2013.01); *B60C 11/01* (2013.01); *B60C 11/0306* (2013.01); *B60C 2011/0369* (2013.01)

(58) Field of Classification Search
USPC ........................................ 152/209.22, 209.27
See application file for complete search history.

(56) References Cited

U.S. PATENT DOCUMENTS

| 6,073,668 A | * | 6/2000 | Iwasaki et al. | ........... 152/209.14 |
| 2007/0000590 A1 | | 1/2007 | Murata | |

FOREIGN PATENT DOCUMENTS

| JP | 61-006007 A | * | 1/1986 |
| JP | 63-159107 A | * | 7/1988 |
| JP | 63-291703 A | | 11/1988 |
| JP | 63-312204 A | * | 12/1988 |
| JP | 01-309806 A | | 12/1989 |

(Continued)

OTHER PUBLICATIONS

Machine translation for Japan 2006-232012 (no date).*

(Continued)

*Primary Examiner* — Steven D Maki
(74) *Attorney, Agent, or Firm* — Sughrue Mion, PLLC

(57) ABSTRACT

A pneumatic radial tire in which a plurality of land portion rows 2 are formed by a plurality of main grooves that extend in the circumferential direction on a tread portion of a tire, and a thin groove 3 that extends in the tire circumferential direction is formed in at least one shoulder land portion row 2A that is positioned on the tread end among the plurality of land portion rows. A land portion 5 that is positioned between, the thin groove 3 and the tread end 4 is partitioned into a plurality of blocks 5a by a lug groove 6 that extends in the tire width direction and whose maximum groove depth is set deeper than the groove depth of the thin groove, and the groove depth of the lug groove continuously changes so as to become a maximum at an intermediate position between the thin groove and the tread end. According to the present invention, it is possible to provide a pneumatic radial tire that can achieve improved drainage performance.

8 Claims, 2 Drawing Sheets

(56) References Cited

FOREIGN PATENT DOCUMENTS

| | | | |
|---|---|---|---|
| JP | 01-309806 A | * | 12/1989 |
| JP | 2-133203 A | | 5/1990 |
| JP | 03-193507 A | * | 8/1991 |
| JP | 09-226323 A | * | 9/1997 |
| JP | 11-301214 A | | 11/1999 |
| JP | 2000-016025 A | | 1/2000 |
| JP | 2005-231420 A | | 9/2005 |
| JP | 2006-232012 A | * | 9/2006 |
| JP | 2006-347512 A | | 12/2006 |
| KR | 2004-0027035 A | * | 4/2004 |
| WO | 2007/145177 A1 | | 12/2007 |

OTHER PUBLICATIONS

Machine translation for Japan 09-226323 (no date).*
Machine translation for Korea 2004-0027035 (no date).*
European Search Report issued in European Application No. 08721773.3, dated Aug. 2, 2011.
International Search Report for International Application No. PCT/JP2008/054357 dated May 20, 2008.
Japanese Office Action issued in Japanese Application No. 2007-063561 dated Mar. 8, 2011 (with translation) (4 pages).

* cited by examiner

PNEUMATIC RADIAL TIRE WITH TREAD HAVING THIN CIRCUMFERENTIAL GROOVE AND LUG GROOVE

TECHNICAL FIELD

The present invention relates to a pneumatic radial tire, and in particular relates to a pneumatic tire with improved drainage performance.

Priority is claimed on Japanese Patent Application No. 2007-063561, filed Mar. 13, 2007, the content of which is incorporated herein by reference.

BACKGROUND ART

As a conventional pneumatic radial tire, there is known one in which a plurality of land portion rows are formed by a plurality of main grooves that extend in the circumferential direction of the tread portion of a tire, a thin groove that extends in the tire circumferential direction is formed in the shoulder land portion row that is positioned on the tread end side among the plurality of land portion rows, and lug grooves are formed that extend in the tire width direction from the thin groove to the tread end (for example, refer to Patent Document 1).

In this type of pneumatic radial tire, it is possible to suppress eccentric wear of the tire with the thin groove, and also it is possible to drain water that has flowed into the thin groove to the outside in the tire width direction through the lug grooves.

[Patent Document 1] Japanese Unexamined Patent Application, First Publication No. H11-301214

DISCLOSURE OF THE INVENTION

Problem to be Solved by the Invention

Nevertheless, in the pneumatic radial tires disclosed in Patent Document 1, the following problems have been pointed out.

That is, in this type of pneumatic radial tire, as shown in (a) of FIG. 3, the groove depth Db of the lug groove 101 is usually set deeper than the groove depth Da of the thin groove 100. For this reason, as shown in (b) of FIG. 3, when water flows from the thin groove 100 to the lug groove 101, there has been a problem of the flow being disturbed by the step 102 that exists between the thin groove 100 and the lug groove 101, causing a turbulent flow that leads to rapid water drainage not being possible.

The present invention was achieved in view of the above circumstances, and has as its object to provide a pneumatic radial tire that can achieve improved drainage performance.

Means for Solving the Problem

The present invention adopts the following apparatus in order to solve the aforementioned issues.

A pneumatic radial tire in accordance with a first aspect of the present invention is a pneumatic radial tire in which a plurality of land portion rows are formed by a plurality of main grooves that extend in the circumferential direction on a tread portion of a tire, and a thin groove that extends in the tire circumferential direction is formed in at least one shoulder land portion row that is positioned on the tread end among the plurality of land portion rows, in which a land portion that is positioned between the thin groove and the tread end is partitioned into a plurality of blocks by a lug groove that extends in the tire width direction and whose maximum groove depth is set deeper than the groove depth of the thin groove, and the groove depth of the lug groove continuously changes so as to become a maximum at an intermediate position between the thin groove and the tread end.

Note that the intermediate position stated here between the thin groove and the tread end is not limited to the middle position between the thin groove and the tread end, and means a position in a wide range from the vicinity of an opening position of the lug groove to the thin groove to the vicinity of an opening position of the lug groove to the tread end, excluding the opening position of the lug groove to the thin groove and the opening position of the lug groove to the tread end.

According to the pneumatic radial tire in accordance with the first aspect of the present invention, since the groove depth of the lug groove continuously changes so as to become a maximum at an intermediate position between the thin groove and the tread end, when water is discharged to the outside in the tire width direction through the lug groove, turbulent flows are hindered from occurring.

Note that while making the groove depth of the lug groove deep is effective for ensuring that the drainage amount by the lug groove is at least a predetermined value while ensuring a wide tire contact surface area, when the groove depth is made too deep, turbulent flows will arise as described in the conventional example from the relation with the thin groove.

Here, in order to satisfy both requirements of securing to some extent the groove depth of the lug groove and not causing turbulent flows, the groove depth of the lug groove is continuously changed so that it may become a maximum in the intermediate position between the thin groove and the tread end. Thereby, rapid drainage that utilizes the lug groove can be realized.

A pneumatic radial tire according to a second aspect of the present invention is characterized by the groove depth of the portion of the lug groove that opens to the thin groove being equal to the groove depth of the thin groove.

By setting the groove depth of the lug groove and the groove depth of the thin groove to be equal, turbulent flows are hindered from occurring when water moves from the thin groove to the lug groove. Thereby, rapid drainage that utilizes the lug groove can be realized.

A pneumatic radial tire according to a third aspect of the present invention is characterized by the edge portion of the block on a side of the thin groove being chamfered.

By chamfering the edge portion of the block on the side of the thin groove in this way, it is possible to prevent turning-up deformation of the edge portion of the same block on the side of the thin groove that tends to occur during braking. As a result, sufficient braking performance is obtained.

A pneumatic radial tire according to a fourth aspect of the present invention is characterized by the land portion between the thin groove and the main groove that is adjacent thereto being a rib that is continuous in the circumferential direction.

By providing a rib in the land portion between the thin groove and the main groove in this way, it is possible to increase the rigidity of the land portion in the vicinity of the thin groove that falls somewhat due to the existence of the thin groove. Thereby, it is possible to further increase the braking performance.

Effect of the Invention

According to the present invention, since the groove depth of the lug groove continuously changes so as to become a maximum at an intermediate position between the thin groove and the tread end, when water is discharged to the outside in the tire width direction through the lug groove, turbulent flows are hindered from occurring, and it is possible to realize rapid drainage that utilizes the lug groove.

DESCRIPTION OF REFERENCE NUMERALS

1 main groove; 2 land portion row; 2A shoulder land portion row; 2AA land portion (rib); 3 thin groove; 4 tread end; 5 land portion; 5*a* block; 5*aa* edge portion of block on a side of thin groove; 6 lug groove; Dc groove depth of portion of lug groove opening to thin groove

BEST MODE FOR CARRYING OUT THE INVENTION

Figure 1:
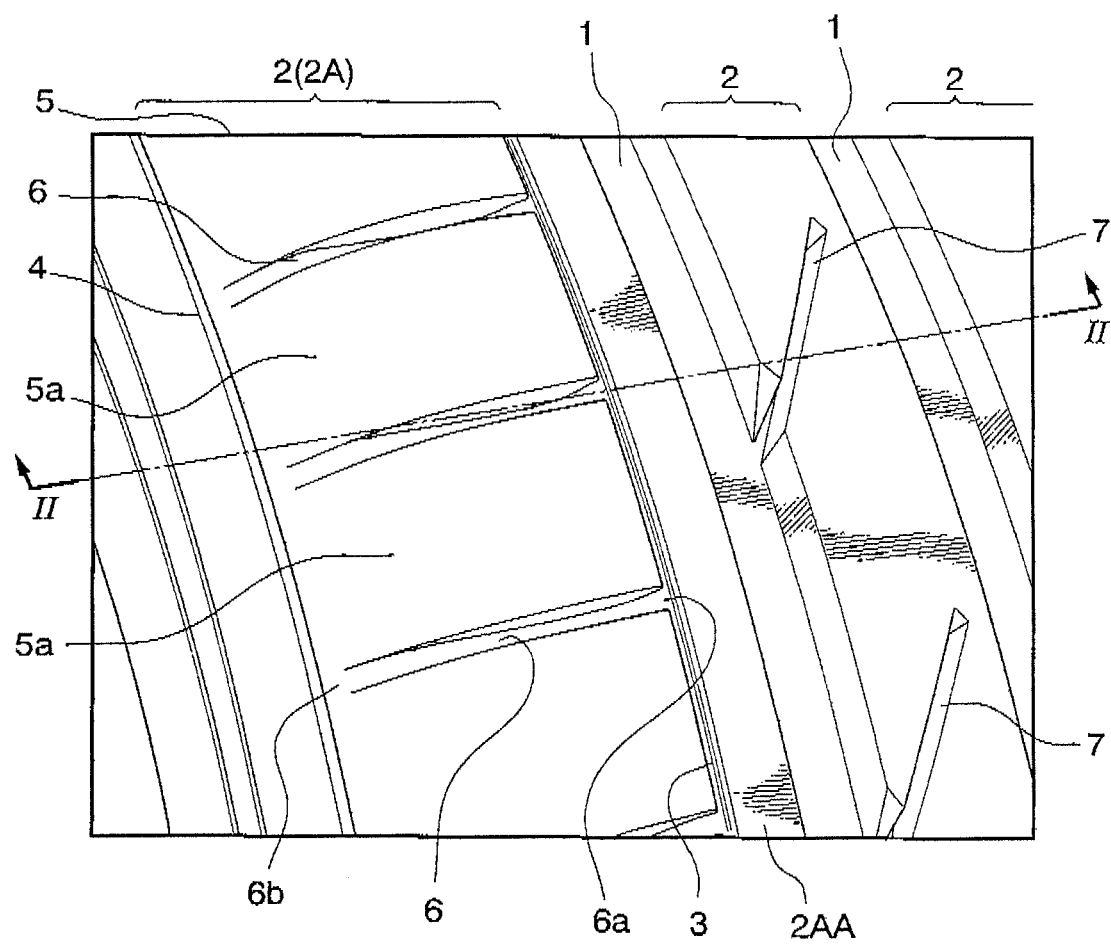
FIG. 1 A plan view of the essential portions of the pneumatic radial tire according to the embodiment of the present invention.
Figure 2:
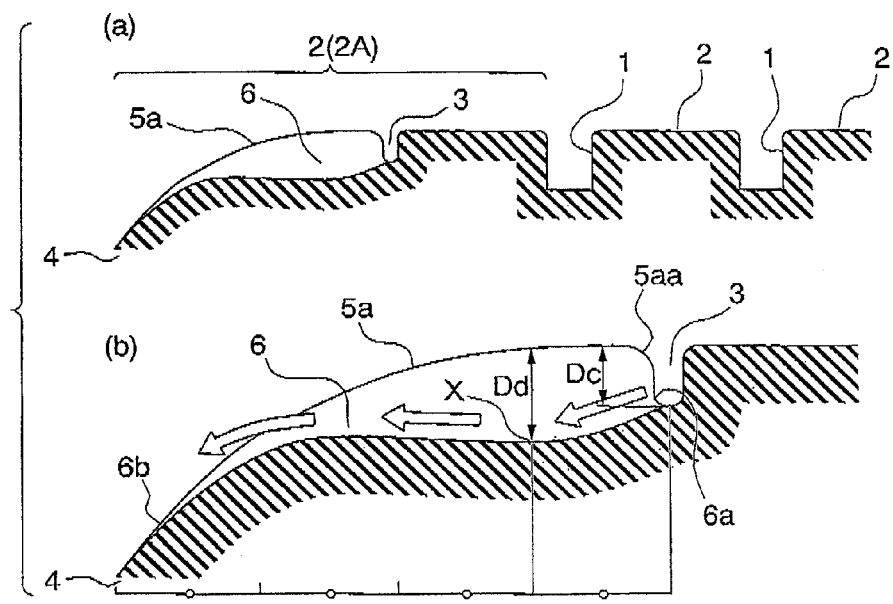
FIG. 2(*a*) is a cross-sectional view along line II-II of FIG. 1, and (*b*) is an enlargement of a portion of (a).

Hereinbelow, the embodiment of the pneumatic radial tire in accordance with the present invention shall be described with reference to the drawings. FIG. 1 is a plan view that shows an example of the tread pattern that is formed on the tread surface of the radial tire that shows the embodiment of this invention, (a) of FIG. 2 is a cross-sectional view along line II-II of FIG. 1, and (b) of FIG. 2 is an enlargement of a portion of (a) of FIG. 2.

In the tread portion of the tire, a plurality of land portion rows 2 are formed by a plurality of main grooves 1 that extend in the circumferential direction. In a shoulder land portion row 2A that is positioned on the tread end among the plurality of land portion rows, a thin groove 3 that extends in the tire circumferential direction is formed.

A land portion 5 that is positioned between the thin groove 3 and the tread end 4 is partitioned into a plurality of blocks 5*a* by lug grooves 6 that extend in the tire width direction and are provided at a uniform interval in the tire circumferential direction.

The groove depth of each lug groove 6 continuously changes without producing a step so as to become a maximum at an intermediate position between the thin groove 3 and the tread end 4.

The intermediate position stated here between the thin groove 3 and the tread end 4 is not limited to the middle position between the thin groove 3 and the tread end 4, and means a position in a wide range from the vicinity of an opening position 6*a* of the lug groove 6 to the thin groove 3 to the vicinity of an opening position 6*b* of the lug groove 6 to the tread end 4, excluding the opening position 6*a* of the lug groove 6 to the thin groove 3 and the opening position 6*b* of the lug groove 6 to the tread end 4.

Note that as shown in (b) of FIG. 2, in this embodiment, a place X at which the groove depth of the lug groove 6 becomes a maximum is a position approximately one-quarter in the length direction of the lug groove 6 from the opening position 6*a* to the thin groove 3 to the opening position 6*b* to the tread end 4, and is set to a position approaching the thin groove 3.

Also, the groove depth at the portion of the lug groove 6 that opens to the thin groove 3, that is, a groove depth. Dc of the opening position of the lug groove 6 to the thin groove 3, is set to a value equal to the groove depth of the thin groove 3.

Accordingly, the maximum groove depth Dd of the lug groove 6 is inevitably a value deeper than the groove depth Dc of the thin groove 3. As shown in at least FIG. 2, the groove depth of the lug groove may be greatest between a location distant from the thin groove toward the tread end in the tire width direction by at least a distance equal to the depth of the thin groove and a location being in a vicinity of an opening position of the lug groove to the tread end, excluding the opening position of the lug groove to the tread end. Also, in the tire width direction, and between the maximum groove depth and the tread end, a bottom surface of the lug groove may rise with respect to the rotational axis of the tire.

Also, as shown in (b) of FIG. 2, an edge portion 5*aa* on a side of the thin groove 3 of each block 5*a* that constitutes the land portion 5 positioned between the thin groove 3 and the tread end 4 is chamfered with the curvature diameter being in the range of 0.5 mm to 2 mm.

Also, as shown in FIG. 1, a land portion 2AA that is one portion of the shoulder land portion row 2A and between the thin groove 3 and the main groove 1 that is adjacent thereto serves as a rib that is continuous in the circumferential direction and has no intersecting grooves.

Moreover, in the main groove 1 that is adjacent to the land portion 2AA that constitutes the rib, a slanted groove 7 that extends obliquely in the direction opposite to the land portion 2AA, that is, toward the tire equator, is formed in a plurality in the circumferential direction at a uniform interval.

Next, the operation of the pneumatic radial tire with the aforementioned constitution shall be described.

In the case of the road surface being wet due to rain or the like, water penetrates into the thin groove 3 without being limited to the main grooves 1. The water that has entered the thin groove 3 passes from there through the lug grooves 6 to be discharged to the outside in the tire width direction.

At this time, since the depth of the lug groove 6 continuously changes so as to become a maximum at the intermediate position of the thin groove 3 and the tread end 4, that is, between the opening positions 6*a* and 6*b* to the thin groove 3 and the tread end 4, when the water passes from the thin groove 3 through the lug grooves 6 to be discharged to the outside in the tire width direction, turbulent flows are hindered from occurring.

That is, here, in order to satisfy both requirements of securing to some extent the groove depth of the lug groove 6 so that a predetermined cross-sectional area is obtained and not causing turbulent flows, the groove depth of the lug groove 6 is continuously changed so that it may become a maximum in the intermediate position between the thin groove 3 and the tread end 4. Thereby, rapid drainage that utilizes the lug groove 6 becomes possible.

Also, here the groove depth Dc of the portion of the lug groove 6 that opens to the thin groove 3 is set to a value equal to the groove depth of the thin groove 3. Thereby, when water moves from the thin groove 3 to the lug groove 6, to the extent that there is no step, turbulent flows are further hindered from occurring. Accordingly, more rapid drainage that utilizes the lug grooves 6 becomes possible.

Also, here, the edge portion 5*aa* on the side of the thin groove 3 of each block 5*a* that constitutes the land portion 5 positioned between the thin groove 3 and the tread end 4 is chamfered, and thereby it is possible to prevent turning-up deformation of the edge portion on the side of the thin groove of the same block 5*a* that tends to occur during braking. As a result, sufficient braking performance is obtained.

Figure 3:
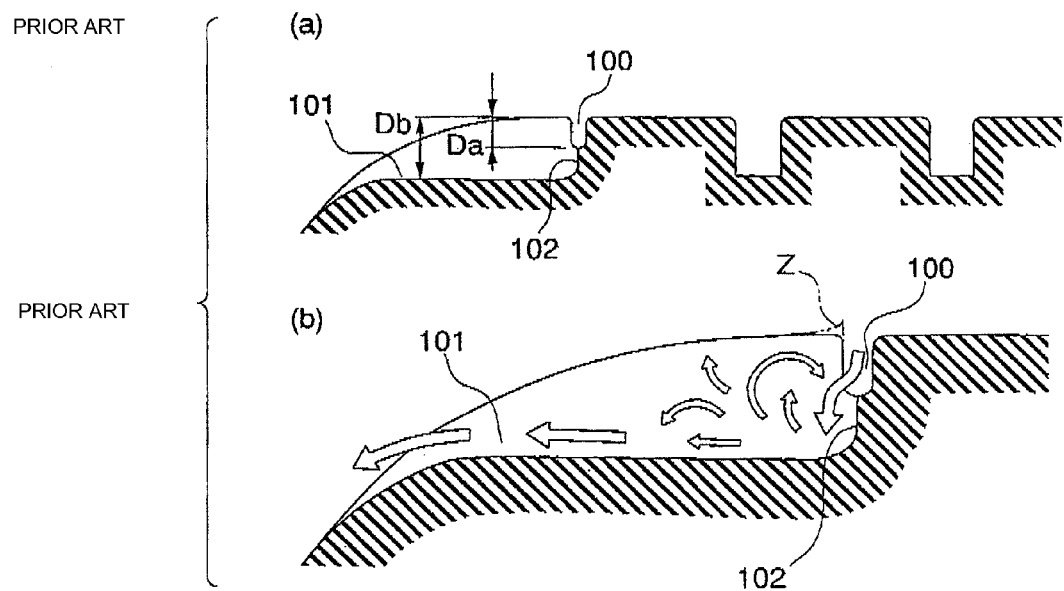
FIG. 3 (*a*) is a cross-sectional view that shows an example of a conventional pneumatic radial tire, and (*b*) is an enlargement of a portion of (a).

Incidentally, in the case of the corner portion remaining without chamfering the edge portion of the same block on the side of the thin groove, as shown by the double-dotted and dashed line Z in (b) of FIG. 3, as a result of deformation of each location being accumulated during braking, the turning-up deformation at the same corner portion occurs, and for this reason the problem of sufficient braking performance not being obtained may occur.

Moreover, in this embodiment, the land portion 2AA that is one portion of the shoulder land portion row 2A and between the thin groove 3 and the main groove 1 that is adjacent thereto serves as a rib that is continuous in the circumferential direction and has no intersecting grooves, and by this rib, it is possible to increase the rigidity of the land portion in the vicinity of the thin groove 3 that tends to fall due to the existence of the thin groove 3. Thereby, it is possible to further increase the braking performance.

Note that the present invention is not limited to the aforementioned embodiment, and suitable design modifications can be made within the scope that does not depart from the spirit of the invention.

For example, in the aforementioned embodiment, the example was described of the place X at which the groove depth of the lug groove 6 becomes a maximum being a position approximately one-quarter in the length direction of the lug groove 6 from the opening position 6a to the thin groove 3 to the opening position 6b to the tread end 4, and being set to a position approaching the thin groove 3. However, it is not limited thereto, and the place at which the groove depth of the lug groove 6 becomes a maximum may be any over a wide range from the vicinity of the opening position 6a of the lug groove 6 to the thin groove 3 to the vicinity of the opening position 6b of the lug groove 6 to the tread end 4, excluding the opening position 6a of the lug groove 6 to the thin groove 3 and the opening position 6b of the lug groove 6 to the tread end 4.

Also, in the aforementioned embodiment, the groove depth at the portion of the lug groove 6 that opens to the thin groove 3, that is, the groove depth Dc of the opening position of the lug groove 6 to the thin groove 3, is set to a value equal to the groove depth of the thin groove 3, but it is not always necessary to do so, and provided it is to a degree in which a minimal step is produced to an extent of turbulent flows not being produced when water flows, the groove depths thereof may be allowed to differ.

Embodiments

The pneumatic radial tire according to the present invention shown in FIG. 1 and (a) and (b) of FIG. 2 and a conventional pneumatic radial tire shown in (a) and (b) of FIG. 3 were manufactured, and a dry-road braking performance evaluation and hydroplaning performance evaluation of these specimen tires were conducted.

Here, the sample tires were summer tires of size 205/55R16 and rim width of 6.5J-16. These specimen tires were mounted on a European sedan, and under the loading condition that added an additional 600 N to the driver's weight, the tires were inflated to the vehicle's specified pressure, and the tires were evaluated.

Also, in the braking performance evaluation on a dry road, deceleration from a speed of 100 km/h in the state of the ABS function being applied was measured. Also, in the hydroplaning performance evaluation, the hydroplaning occurrence speed during acceleration was measured at a water depth of 10 mm.

Note that for each of these evaluation items, the comparison is numerically expressed with the value of a conventional pneumatic radial tire serving as a control (100). A higher value indicates a better result.

Hereinbelow, the results relating to each evaluation item are shown.

In the braking performance evaluation, with the conventional pneumatic radial tire being 100, the pneumatic radial tire according to the present invention was 104.

Also, in the hydroplaning performance evaluation, with the conventional pneumatic radial tire being 100, the pneumatic radial tire according to the present invention was 103.

In this way, according to the tire of the present embodiment, due particularly to the form of the lug groove 6 and the form of the edge portion 5aa of the block 5a on the side of the thin groove that are disposed in the tread portion, and forming the rib 2AA between the thin groove and the main groove, it could be confirmed that the braking performance and the drainage performance were improved.

INDUSTRIAL APPLICABILITY

According to the present invention, it is possible to provide a pneumatic radial tire that can achieve improved drainage performance.

The invention claimed is:

1. A pneumatic radial tire in which a plurality of land portion rows are formed by a plurality of main grooves that extend in the circumferential direction on a tread portion of a tire, and a thin groove that extends in the tire circumferential direction is formed in at least one shoulder land portion row that is positioned on the tread end among the plurality of land portion rows,
   wherein a land portion that is positioned between the thin groove and the tread end is partitioned into a plurality of blocks by a lug groove that extends in the tire width direction and whose maximum groove depth is set deeper than the groove depth of the thin groove, the groove depth of the lug groove continuously changes so as to become a maximum at an intermediate position between the thin groove and the tread end,
   in the tire width direction, and between the maximum groove depth and the tread end, a bottom surface of the lug groove rises with respect to the rotational axis of the tire,
   the bottom surface of the lug groove which rises is located closer to an inner side in the tire radial direction than the bottom surface of the lug groove which is closest to the thin groove, and
   the groove depth of the lug groove is greatest between a location distant from the thin groove toward the tread end in the tire width direction by at least a distance equal to the depth of the thin groove and a location being in a vicinity of an opening position of the lug groove to the tread end, excluding the opening position of the lug groove to the tread end,
   wherein the thin groove has a first axially inner wall surface and a second axially outer wall surface,
   wherein a depth of the lug groove at a position of the second wall surface is deeper than at a position of the first wall surface.

2. The pneumatic radial tire according to claim 1, wherein the groove depth of the portion of the lug groove that opens to the thin groove is equal to the groove depth of the thin groove.

3. The pneumatic radial tire according to claim 1 or claim 2, wherein an edge portion of the block on a side of the thin groove is chamfered.

4. The pneumatic radial tire according to claim 1 or claim 2, wherein the land portion between the thin groove and the main groove that is adjacent thereto is a rib that is continuous in the circumferential direction.

5. The pneumatic radial tire according to claim 3, wherein the land portion between the thin groove and the main groove that is adjacent thereto is a rib that is continuous in the circumferential direction.

6. The pneumatic radial tire according to claim 1, wherein the maximum groove depth of the lug groove is shallower than a groove depth of the plurality of the main grooves.

7. The pneumatic radial tire according to claim 1, wherein a place at which the groove depth of the lug groove becomes a maximum is a position one-quarter in a length direction of the lug groove from an opening position to the thin groove to the opening position to the tread end, and is set to a position approaching the thin groove.

8. A pneumatic radial tire in which a plurality of land portion rows are formed by a plurality of main grooves that extend in the circumferential direction on a tread portion of a tire, and a thin groove that extends in the tire circumferential direction is formed in at least one shoulder land portion row that is positioned on the tread end among the plurality of land portion rows, wherein a land portion that is positioned between the thin groove and the tread end is partitioned into a plurality of blocks by a lug groove that extends in the tire width direction and whose maximum groove depth is set deeper than the groove depth of the thin groove, the groove depth of the lug groove continuously changes so as to become a maximum at an intermediate position between the thin groove and the tread end, in the tire width direction, and between the maximum groove depth and the tread end, a bottom surface of the lug groove rises with respect to the rotational axis of the tire, the bottom surface of the lug groove which rises is located closer to an inner side in the tire radial direction than the bottom surface of the lug groove which is closest to the thin groove, and the groove depth of the lug groove is greatest between a location distant from the thin groove toward the tread end in the tire width direction by at least a distance equal to the depth of the thin groove and a location being the vicinity of an opening position of the lug groove to the tread end, excluding the opening position of the lug groove to the tread end, wherein the groove depth of the portion of the lug groove that opens to the thin groove is equal to the groove depth of the thin groove, wherein an edge portion of the block on a side of the thin groove is chamfered, and wherein the bottom surface of the lug groove has a curved shape such that the groove depth of the lug groove gradually increases from the thin groove to the maximum groove depth, wherein the thin groove has a first axially inner wall surface and a second axially outer wall surface, wherein a depth of the lug groove at a position of the second wall surface is deeper than at a position of the first wall surface.

* * * * *